US008243970B2

(12) United States Patent
Dent

(10) Patent No.: US 8,243,970 B2
(45) Date of Patent: Aug. 14, 2012

(54) VIRTUAL REALITY SOUND FOR ADVANCED MULTI-MEDIA APPLICATIONS

(75) Inventor: Paul Wilkinson Dent, Pittsboro, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1038 days.

(21) Appl. No.: 12/189,525

(22) Filed: Aug. 11, 2008

(65) Prior Publication Data

US 2010/0034404 A1 Feb. 11, 2010

(51) Int. Cl.
*H04R 5/02* (2006.01)
*G06F 17/00* (2006.01)

(52) U.S. Cl. .............. 381/310; 381/17; 381/18; 381/19; 381/1; 455/456.1; 700/94

(58) Field of Classification Search ................ 381/1, 17, 381/18, 74, 306, 309, 310, 19; 700/94; 455/456; 370/18
See application file for complete search history.

(56) References Cited

U.S. PATENT DOCUMENTS 5,280,472 A * 1/1994 Gilhousen et al. ............ 370/335
5,633,993 A * 5/1997 Redmann et al. ............. 345/419
5,771,041 A 6/1998 Small
5,802,180 A * 9/1998 Abel et al. ...................... 381/17
5,950,202 A * 9/1999 Durward et al. ...................... 1/1
6,047,192 A * 4/2000 Maloney et al. ........... 455/456.2
6,151,027 A * 11/2000 Yoo .............................. 345/423
6,348,927 B1 * 2/2002 Lipkin .......................... 345/619
6,418,226 B2 * 7/2002 Mukojima ...................... 381/17
2003/0059070 A1 * 3/2003 Ballas ........................... 381/309
2006/0029243 A1 * 2/2006 Gerrard et al. ................ 381/310
2006/0097930 A1 * 5/2006 Rosenberg et al. ........... 343/702
2008/0044005 A1 * 2/2008 Johnston ................. 379/433.01

OTHER PUBLICATIONS

Brungart. Control of Perceived Disance in Virtual Audio Displays. Proceedings of the 20th Annual International Conference of the IEEE Engineering in Medicine and Biology Society, vol. 20, # 3, 1998, pp. 1101-1104.*

Alexei Ossadtchi, et al. "Immersive Audio Rendering Algorithms Using the Ti C62 Evm Board," Integrated Media Systems Center, University of Southern California ,3740 McClintock Ave., EEB 432 Los Angeles, California 90089-2564 (no date).

"Research Directions in Virtual Environments" Report of an NSF Invitational Workshop Mar. 23-24, 1992 University of North Carolina at Chapel Hill.

Fred Brooks, "Is There Any Real Virtue in Virtual Reality? • What ? • Why? • So What?" University of North Carolina, Chapel Hill, Apr. 21, 1998.

(Continued)

*Primary Examiner* — Colleen Matthews
*Assistant Examiner* — Galina Yushina

(57) ABSTRACT

The method and apparatus described herein generates realistic audio for a virtual reality simulation based on the position (location and orientation) of a participant's head. The audio may be generated based on independent and dependent audio profiles. The independent audio profile represents the participant-independent propagation of sound from a virtual source to each of one or more virtual objects in the simulation. The dependent audio profile represents the propagation of the sound from each of the one or more virtual objects to the head or ears of the participant based on a position of the participant's head or ears. An audio processor generates the desired audio signal at the head of the participant by combining the dependent and independent audio profiles to determine a total audio profile for the virtual source, and filtering an audio wave corresponding to the virtual source based on the total audio profile.

18 Claims, 5 Drawing Sheets

OTHER PUBLICATIONS

Greg Welch, et al. "High-Performance Wide-Area Optical Tracking, The Hi-Ball Tracking System," Presence, vol. 10, No. 1, Feb. 2001, 1-21 © 2001 by the *Massachusetts Institute of Technology*.

Fred Brooks, "What's Real About Virtual Reality?" Special Report 0272-1716/99 © 1999 IEEE.

* cited by examiner

VIRTUAL REALITY SOUND FOR ADVANCED MULTI-MEDIA APPLICATIONS

BACKGROUND

The present invention relates generally to virtual reality, and more particularly to the generation of realistic audio for one or more participants of a virtual reality simulation.

Audio entertainment has progressed from the era of live performances to recorded performances stored on such media as records, tapes, compact discs (CDs), digital memories, etc., and played back on such devices as the Edison phonograph, the gramophone, the tape recorder, the CD player, digital players (e.g., MP3 players), and wireless receivers, many of which include two or more channels of stereophonic sound. Video entertainment has similarly progressed from the era of live performances to that of recorded performances. Over time, recorded videos have been stored for playback on such devices as the Magic Lantern, the cinematograph, the television receiver, the VCR, and the CD/DVD, none of which, by contrast with sound, have made much use of stereoscopic or 3D vision. Nevertheless, stereoscopic vision is well known, and stereoscopic goggles, also known as 3D or virtual reality goggles may be purchased, for use with various video formats, e.g., computer games.

The term "virtual reality goggles" is often mistakenly interchanged with the term "3D goggles." However, conventional 3D goggles lack an essential feature that distinguishes real virtual reality from mere 3D. When a viewer uses 3D goggles, the image presented to each eye is computed independently of the real location and/or orientation (yaw, pitch, and roll angles) of the viewer's head. Consequently, the scene appears fixed in relation to the goggles, instead of fixed in external space. For example, if the viewer's head tilts to the left, all objects appear to tilt to the left, which violates the signals the user receives from his/her balance organs and destroys the illusion. Real virtual reality aims to correct this deficiency by providing a head position sensor with the goggles, from which the actual position (location and orientation) of each eye may be determined. No particular technological solution for this has been standardized.

Providing realistic images to each eye based on a position of the eyes requires a large amount of real-time computing. For example, virtual reality may require updating a panoramic image of 2048×1024 pixels for each eye every few milliseconds in dependence on the location and orientation of each eye. Such an enormous amount of real-time computing typically required virtual reality demonstrations to be performed in the laboratory. However, the power of affordable computers has increased many-fold since the first real-time virtual reality demonstration approximately 15 ago. Also, the recognition of the existence of common computations in some virtual reality scenes has helped reduce the computational cost. For these reasons, and because of the greatly improved experience of virtual reality over mono-vision or even over 3D vision, virtual reality may become affordable and desirable in the mass entertainment market at some future time.

Virtual reality generally requires a delay of only a few milliseconds between receiving head position signals and delivering a 2-megapixel image to each eye. Such requirements make it unlikely that the virtual reality experience may be provided in real time from a distant source, such as over the Internet or by television broadcast, for example. The processor(s) that implement a virtual reality simulation should therefore be located close to the virtual reality participant. As such, the real-time requirements of virtual reality should make it attractive to businesses that provide entertainment to multiple co-located individuals, e.g., cinemas.

Because virtual reality is still in its infancy, many details are still under investigation, such as the best technology for providing head location/orientation information, and the best way to generate realistic virtual reality audio to complement the virtual reality imaging. Thus, there remains a need for further improvements to existing virtual reality technology.

SUMMARY

The present invention provides a method and apparatus for generating realistic audio in a virtual reality simulation based on the location and orientation of a participant's head. The claimed method and apparatus may be applied to multiple participants and/or to multiple virtual audio sources associated with the virtual reality simulation. Thus, the invention described herein is particularly applicable to virtual reality simulations presented to multiple co-located participants, such as those in a cinema.

In one exemplary method, the virtual audio is generated based on participant independent and dependent audio profiles. The independent audio profile is pre-computed and stored in memory. The independent audio profile represents the participant-independent propagation of sound, including reflections and absorptions, from a virtual source to each of one or more virtual objects in the virtual reality simulation. The dependent audio profile, which is dynamically computed, represents the propagation of the sound from each of the one or more virtual objects in the virtual reality simulation to the participant's head based on a determined position (location and orientation) of the participant's head. The exemplary method determines a total audio profile for the virtual source by combining the dependent and independent audio profiles, and filters an audio wave corresponding to the virtual source based on the total audio profile to generate the desired audio signal at the head of the participant. In some embodiments, the dependent audio profile may represent the propagation of the sound to a determined position of one or both ears of the participant, where the location and orientation of the ear is determined based on the location and orientation of the head.

DETAILED DESCRIPTION

Figure 1:
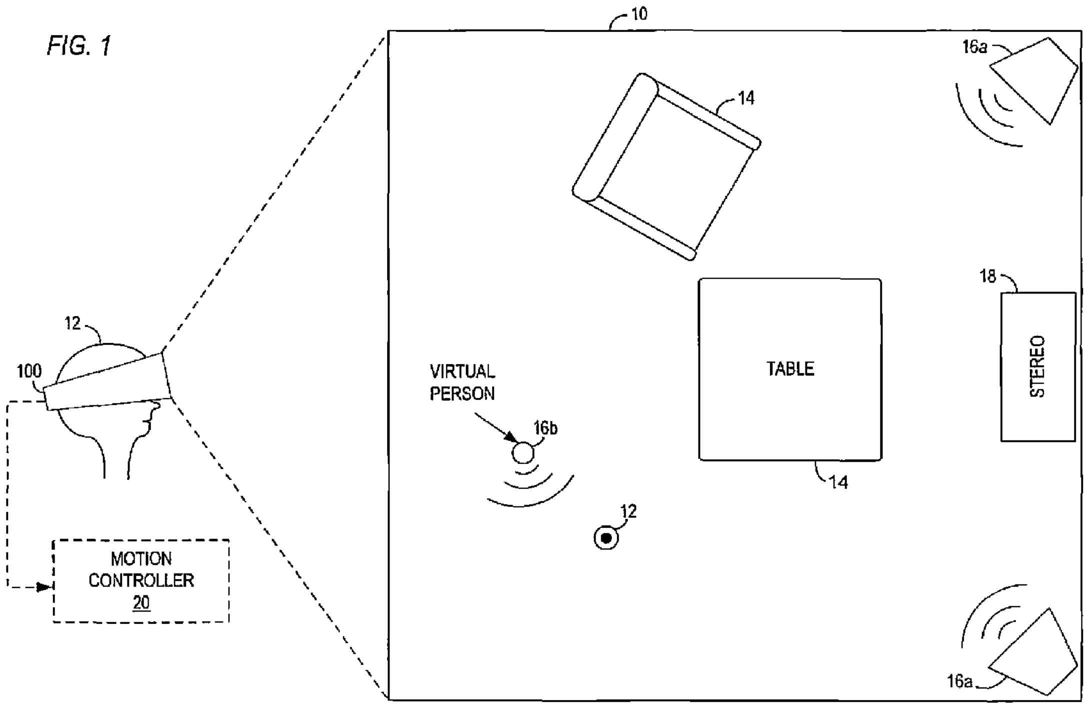
FIG. 1 shows top view of a virtual reality scene for a virtual reality participant.

FIG. 1 shows a top view of a scene 10 of a virtual reality simulation as experienced by a participant wearing a virtual reality headset 100. Scene 10 may include one or more objects 14 and one or more virtual audio sources 16, e.g., speakers **16*a* that project sound produced by a stereo 18, a virtual person 16*b* that speaks, etc. The participant wears the headset 100 while in a viewing room or area so as to view the scene 10 through the headset 100 as if the participant was located at a specific position within the scene 10. As used herein, the term "position" refers to a location (e.g., x, y, and z coordinates) and an orientation (e.g., yaw, pitch, and roll angles). The participant may walk about the viewing room to experience movement within the scene 10. Alternatively, the participant may use an electronic motion controller 20, e.g., a joystick, to simulate movement within the scene 10. The sound projected by the sources 16 defines an audio profile at the head 12 of the participant based on how the objects 14 and sources 16 in the scene 10 reflect and absorb the projected sound. The present invention supplements conventional virtual reality imaging systems with virtual reality audio that considers the position (location and orientation) of the participant's head 12, the position of objects 14 in the scene 10, and the position of sound sources 16 in the scene 10 when generating the audio for the headset 100**.

To facilitate the understanding of the present invention, the following first discusses the general operation of virtual reality imaging. The key difference between virtual reality imaging when compared to mere 3D imaging (stereoscopic) is that virtual reality re-computes each video frame to each eye depending on the momentary eye locations deduced from the position of the participant's head 12, thus making virtual reality objects 14 appear spatially fixed and solid despite user movements relative to them. A headset 100 for delivering a virtual reality experience to the participant preferably comprises two small high-resolution LCD displays 102 (FIG. 2) with associated optics to fill the entire field of view of more than 180° around each eye, and earphones 104 for delivering the audio to the participant's ears. Headset 100 also includes a transceiver 106 and an antenna system 108 for communicating with a virtual reality system 200. The transceiver 106 and antenna system 108 receive imaging data determined at a remote virtual reality system 200 based on a determined position of the participant's eyes, and in some embodiments, may provide position information to the virtual reality system 200.

Virtual reality system 200 comprises virtual reality processor 202, memory 204, position processor 206, transmitter 208, and receiver system 210. Virtual reality processor 202 performs the processing required to create the virtual reality images for the participant. Memory 204 stores digital information comprising the attributes of all objects 14 in the scene 10, viewed from whatever angle, and typically comprises a list of surface elements, their initial relative coordinates, and light reflection and absorption properties. Position processor 206 determines the required position information for the head 12 of the participant. The position processor 202 may, for example, determine the head position based on data received from the headset 100 and/or based on other position determining techniques. It will be appreciated that position processor 206 may also determine the position of the participant's eyes and/or ears. Based on the determined position(s) and on information stored in memory 204 about the scene 10, an imaging processor 212 in the virtual reality processor 202 computes a new set of pixels for each display 102, and transmitter 208 transmits the computed pixels to each display 102 in the headset 100 to represent the image that should appear to the participant at the current head position.

A prodigious amount of real-time computing is required for virtual reality imaging, but this has already been demonstrated in research laboratories. The amount of real-time computing may be reduced by separating the pixel computation into a participant-independent computation and a participant-dependent computation. The division of the imaging computation into a participant-independent computation and a much simpler, participant-dependent computation reduces the imaging complexity per viewer, which not only makes the virtual reality system 200 available to more participants, but may also make the virtual reality system 200 practical in a multi-user mass entertainment market, such as cinemas, without requiring a processing power growth proportional to the number of participants.

The participant-independent computation is independent of the participant's head position and comprises simulating the propagation of light from illuminating sources (such as a virtual sun or lamp) to the surface elements of each object 14 in the scene 10 and determining the resultant scattered light. The scattered light is further propagated until it impinges upon further surface elements, disperses to infinity, or is absorbed. The total direct and scattered illumination incident on each surface element is then stored in memory 204 in association with the surface elements of each object 14.

The participant-dependent computation depends on the position of the participant's head 12. Computing the participant-dependent light propagation comprises scanning each surface element from the position of each eye and, based on the stored total illumination (direct and scattered), computing the color/intensity spectrum received at each eye from that position in order to generate a pixel or group of pixels corresponding to the position of the surface element. Light calculations may be performed, for example, by using rays or photons of each of the three primary colors to which the human eye is adapted. Alternatively, if the virtual reality scene 10 is to be delivered faithfully to non-human participants, such as dogs, the light calculations may be performed using rays or photons of random wavelengths selected with a probability frequency from the spectral distribution of the illuminating source to account for the different color perception mechanisms of the non-human participant.

The present invention provides an audio processor 214 in the remote virtual reality processor 202 that generates and transmits realistic audio to the earphones 104 of the headset 100 to complement the virtual reality images transmitted to the displays 102. Broadly, audio processor 214 generates an audio signal for an earphone 104 using real-time simulations of the propagation from each audio source 16 to the specific location and orientation of the participant's head 12. The real-time simulation accounts for the audio reflections and absorptions caused by the objects 14 within the scene 10 upon which the sound is expected to impinge. While the present invention is described in terms of reflections and absorptions occurring at objects 14, for purposes of describing the audio propagation path, the term "object" also applies to the surfaces of other sources 16. In some embodiments, audio processor 214 may simulate the propagation from each audio source 16 to the location and orientation of one or more ears on the participant's head 12. The amount of extra computing required to provide virtual reality audio is a small fraction of the amount of processing required to provide virtual reality images, as, unlike the eye, the ear does not require many "pixels." The direction from which a sound reaches the ear is important insofar as enabling a standard template of the polar plot of hearing sensitivity versus direction to be considered when weighting each sound wave front. Thus, the present invention provides improved virtual reality audio that may be used with any virtual reality imaging system, including future mass market virtual reality systems, such as may be used in a cinema. The location-dependent virtual reality audio simulation described herein may also be of interest as a new audio medium.

Figure 3:
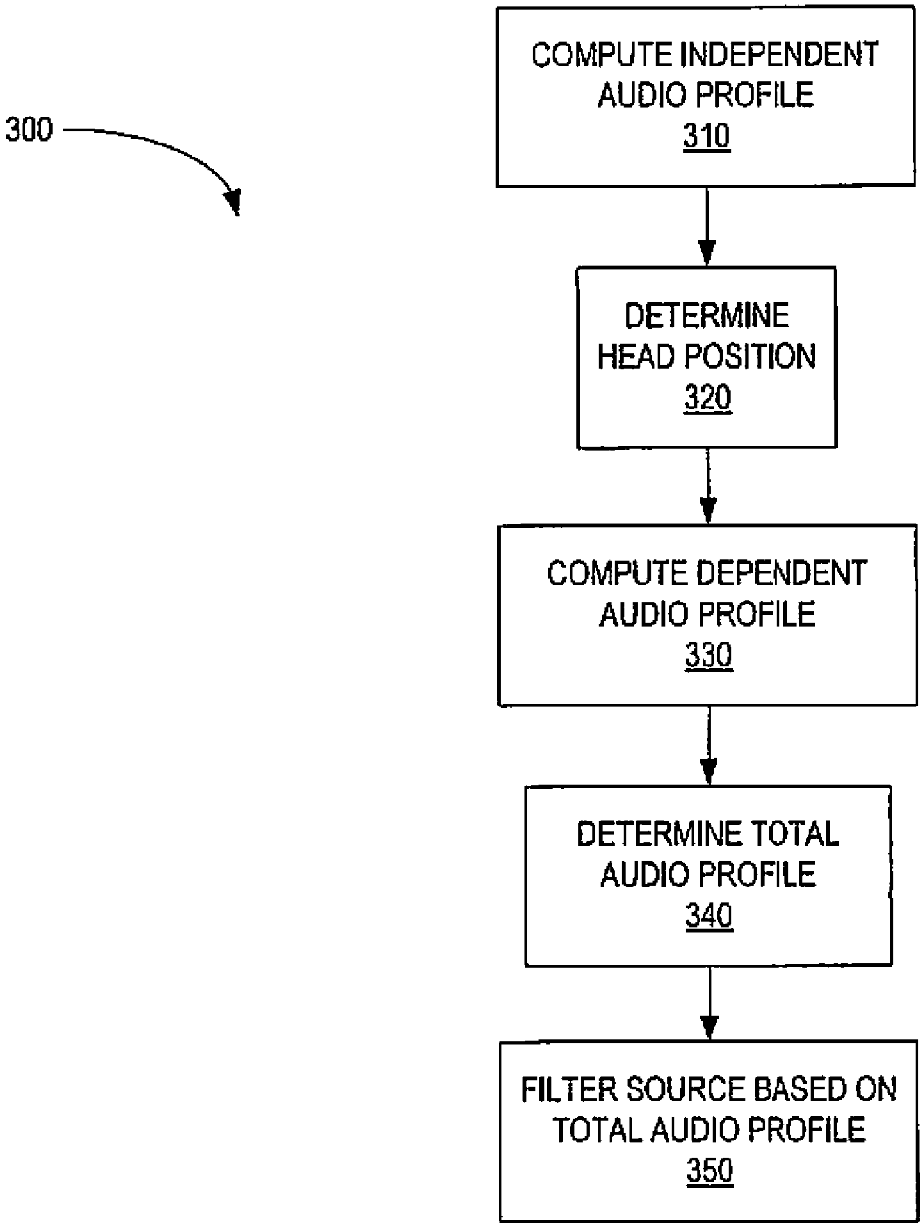
FIG. 3 shows a method for providing virtual reality audio according to the present invention.

FIG. 3 shows a method 300 for generating virtual sound according to one exemplary embodiment of the present invention. Method 300 comprises computing an independent audio profile for a source 16 that represents the sound propagation, including audio reflections and absorptions, from the audio source 16 to each of the objects 14 in the virtual reality scene 10 (block 310). Because the independent audio profile does not depend on the location or orientation of the participant, the independent audio profile represents the participant-independent element of the sound propagation. The independent audio profile is generally stored in memory 204. The method 300 further comprises determining a location and orientation of the head 12 of the participant (block 320). Audio processor 214 computes a dependent audio profile for each source 16 that represents the reflected sound propagation from each object 14 to the head 12 of the participant based on the determined location and orientation of the head 12 (block 330). Because the dependent audio profile depends on the location and orientation of the head 12, the dependent audio profile represents the participant-dependent element of the sound propagation.

With the assumption of linearity, the audio processor 214 combines the corresponding dependent and independent audio profiles to determine a total audio profile, which represents all of the audio reflections, path delays, and attenuation experienced by the audio source 16 as the sound propagates to the participant's current head position (block 340). The audio processor 214 filters a sound track associated with the audio source 16 based on the corresponding total audio profile to generate the virtual audio signal associated with that source 16 as it should sound at the head 12 of the participant (block 350). The filtered audio signal from each source 16 is then transmitted to the headset 100, preferably by wireless means. It will be appreciated that the above-described method may additionally or alternatively be performed relative to the position of one or more of the participant's ears.

To determine the independent audio profile, audio processor 214 accounts for reflections, absorptions, and time delays that occur as the sound from a source 16 propagates. The audio reflections by an object 14 are numerically similar to light reflections, but the mathematical laws are different. An audio wave is broad, as opposed to a light ray, which is narrow. The audio wave reflected by an object 14 is propagated until it encounters other objects 14 from which it is reflected and/or absorbed according to the size and sound reflectivity attributes of the object 14. The audio processor 214 computes the time delay of an audio path from a source to an object 14 based on the distance and the speed of sound. The time delay is assumed to be frequency-independent, which eliminates the need to account for frequency-dependent phase shifts.

Secondary audio wave fronts are reflected and propagated to impinge upon further objects 14 from different angles and so forth until they dissipate. Each surface-element of each object 14 is associated with factors describing the amount of each signal source and its audio profile and any other data needed to determine the audio for each participant's ear. The computation up to this point is independent of the participant's location and orientation, and therefore, the resulting audio profile is participant-independent. It is also independent of the exact audio waveform, and thus does not have to be performed at the audio sampling rate.

The audio processor 214 generates the dependent audio profile by retrieving the audio profile for each surface element of each source 16 from memory 204, propagating the reflected sound to the participant's head 12 by adding each retrieved delay value to the propagation delay of the path from the object 14 to the participant's head, and modifying the audio amplitude values according to distance and any angle-of-arrival factors (e.g., the polar diagram of the ear around the participant's head 12). Adding the independent audio profile from each object 14 corresponding to the same source 16 to the resultant dependent audio profile results in a net or total audio profile from each source 16 to each participant's head 12.

Figure 4:
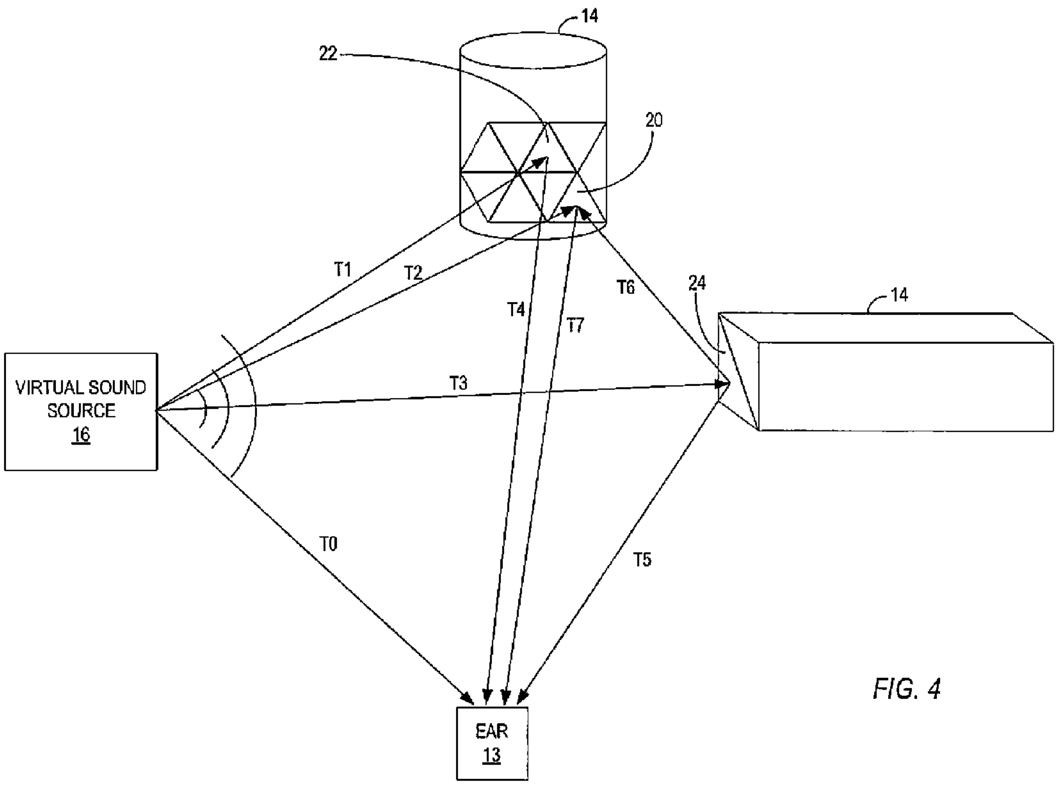
FIG. 4 shows an example of an audio propagation diagram for the present invention.

FIG. 4 shows a simplified audio propagation diagram that provides an example of how the audio processor 214 may accumulate the total audio profile from an audio source 16 to a participant's ear 13. The virtual source 16 may comprise a recorded sound track associated with a sound emitting object, and has location coordinates and an orientation related to the sound emitting object's location coordinates and orientation. For example, virtual source 16 may be a virtual speaker's mouth, which would have an appropriate location on the speaker's face and the same orientation as the speaker's head.

The sound emitting object's orientation is utilized in the computation when the source 16 is not isotropic, but has an associated polar diagram of sound intensity versus angle. Thus, sound rays from the source 16 to different objects 14 have relative amplitudes that are weighted by the value of the polar diagram in the direction of the object 14. The audio processor 214 uses the source's virtual location coordinates to compute the distance, and thus delay, from the source 16 to the surface elements of the objects 14. The surface elements are chosen to be small enough so that their sound reflection is a substantially frequency-independent spherical wave front. Reflected amplitude from a reflecting surface element may also be weighted in dependence on the angle of incidence and/or reflection. A code stored in connection with the object 14 or surface element may be used to determine which of a number of predetermined laws is to be used for such angular weighting. For example, the weighting may be proportional to the surface element area times the cosine of the angle of the surface normal to the angle of incidence and times the cosine of the angle of the surface normal to the angle of reflection, for most plane elements.

In FIG. 4, which provides an extremely simplified case for the purposes of illustration, a number of surface elements typified by reference numbers 20 and 22, describe a first object 16. Element 22 is assumed to be illuminated only by the direct wave from source 16, which reaches it with delay T1. Similarly, the audio wave front propagates with delay T2 to surface element 20 and with delay T3 to surface element 24 of a second object 14. Surface element 24 reflects a wave to the participant's ear 13 with delay T5, but also reflects an audio wave back to surface element 20 with additional delay T6. Thus, the independent audio profile for the illumination of surface element 20 comprises a direct wave with delay T2 and a secondary wave from element 24 with delay T3+T6. More generally, if the independent audio profile to element 24 is known and comprises already more than one wave, it is copied and accumulated to the independent audio profile for element 20 by adding T6 to all its delays. Secondary waves from other elements reaching element 20 have their independent audio profiles similarly copied and accumulated to the cumulative independent audio profile of element 20. By the term "accumulated," it is meant that the amplitudes for waves of the same delay are added. Waves are considered to have the same delay if the delay difference is sufficiently small for the phase difference at the highest frequency of interest to be, for example, less than ±30°, which implies a path difference of less than $1/12^{th}$ of a wavelength. If the highest frequency of interest is 10 kHz, this is equivalent to one sample at a sample rate of 128 kHz. Thus, delays may be quantized to the nearest tick of a 128 kHz sampling clock.

In the simplified case of FIG. 4, therefore, the independent audio profile for source 16 to surface element 20 comprises two waves of different delay, while the independent audio profile from source 16 to surface elements 22 and 24 comprises only a single wave delay. Determining these independent audio profiles is not dependent on the position of the participant's ear, and is therefore a process common to all participants. Moreover, the independent audio profiles do not depend on the actual audio waveform, but only on the scene geometry, and thus do not have to be recomputed for each audio sample, but only when a reflecting object 14 or source 16 moves by more than a certain distance.

The dependent audio profile for the simplified example of FIG. 4 shows the further propagation of the independent audio profiles of each surface element 20, 22, 24, and potentially the direct wave from the source 16, to each participant's ear 13. The audio processor 214 uses the above-described delay accumulation process to determine the dependent audio profiles. The cumulative delay profile of a surface element 20, 22, 24 may have its amplitude scaled in dependence on the cosine of the angle between the element's surface normal and the direction to the participant's ear 13, and has all its delay increased by the path delay from element 20, 22, 24 to the participant's ear 13. The so-modified audio profiles from each surface element 20, 22, 24 to the ear 13 are then accumulated, adding amplitudes for waves of the same delay, to determine the total audio profile as described above. The total audio profile from source 16 to the participant's ear forms the description of the FIR filter 216 through which the source's sound track is played to simulate the acoustic environment at the participant associated with that source 16.

Once the audio processor 214 determines the total audio profile from a source 16 to a participant, the audio processor 214 uses the total audio profile to determine the appropriate audio signal for the participant's current head position. To that end, the audio processor 214 typically uses a filtering process. To implement the filtering step, audio processor 214 reads a number of sound tracks stored in memory 204 according to the same real-time clock used by the imaging processor 212. Each sound track is associated with a source 16, and may have a sound radiation diagram associated with it, if not an isotropic source, making the sound ultimately heard by the participant also a function of the source's location and orientation. A typical example of the latter would be a "virtual person" talking; when facing the participant, the participant would then receive a higher sound level from the virtual speaker's mouth than if the virtual speaker turned away.

For each sound track, audio processor 214 may include an FIR filter 216 to apply the generated audio profile to the sound track, so that source 16 is subject to a realistic audio propagation affect. If the virtual system 200 provides binaural audio, the audio processor 214 may include an FIR filter 216 for each ear and each source 16. The audio processor 214 dynamically updates the coefficients for the FIR filter 216 as the total audio profile changes based on movement by the objects 14, sources 16, and/or the participants. If delays are quantized to the nearest 128 kHz sample as suggested, the FIR filter 216 operates at a sample rate of 128 kHz, which is not challenging. Typically, there are only a handful of virtual audio sources 16. Therefore, a small number of FIR filters 216 may be required for each participant, e.g., 16 filters for 8 sources×2 ears.

If large delays are possible, the number of taps that may be required for each FIR filter 216 may be large. For example, to simulate the acoustics of a cathedral, delays equivalent to a total path of 300 feet may arise, which corresponds to 300 ms or 43,000 taps at a sample rate of 128 kHz. It may therefore be helpful, after determining the total audio profile, to reduce the sampling rate, e.g., to 32 kHz, which is still adequate to represent frequencies up to the limit of human hearing. The equivalent audio profile at a low sample rate is obtained by performing a Discrete Fourier Transform on the total audio profile to obtain the frequency response, which will extend up to 64 kHz when 128 kHz sampling rates are used. The frequency response is then truncated to 16 kHz, reducing the size of the array by a factor of 4. The quarter-sized frequency response so obtained is then subjected to an inverse DFT to obtain the equivalent FIR at ¼ the sample rate, or 32 kHz in this example. Thus, a 10,000-tap FIR filter 216 operating at 32 kHz may be used to represent total delays of up to 300 ms. A reduction factor of 16 in the number of multiplications per second is thereby obtained. For the postulated eight virtual sources 16, this gives a total number of multiply-accumulates per second of 8×2×10,000×32,000 or 5.12 billion per second per participant. In today's technology, this may be implemented in a special FIR filter chip containing a number of multipliers operating in parallel, or alternatively in a chip based on logarithmic arithmetic in which multiplications may be replaced by additions.

In order to compute participant-specific audio, audio processor 214 may use the location and orientation of each participant's head 12. The position information is preferably continuous (rather than discrete) and enables the virtual reality system 200 to determine changes to the head position as small as one centimeter or less within a very small delay, e.g., 1 ms or less. From this information, the ear locations and orientations may be deduced, if desired. The position processor 206 may use any known position detection techniques. For example, the position processor 206 may determine the position from information provided by the headset 100. In this example, the headset 100 may include a position processor 112 that determines the position information using, e.g., a gyroscope, GPS system, etc., where the headset 100 transmits the position information to the virtual reality system 200 via transceiver 106.

The present invention may alternatively use the position determining method described herein to determine the location coordinates (x, y, z) of the participant's head 12 as well as the orientation (e.g., Yaw, Pitch and Roll angles). To achieve the desired resolution and to implement a wireless solution, the position processor 206 may use a forward or reverse GPS CDMA radio system, in which a code delay determines coarse position and an RF phase determines fine position.

Figure 5:
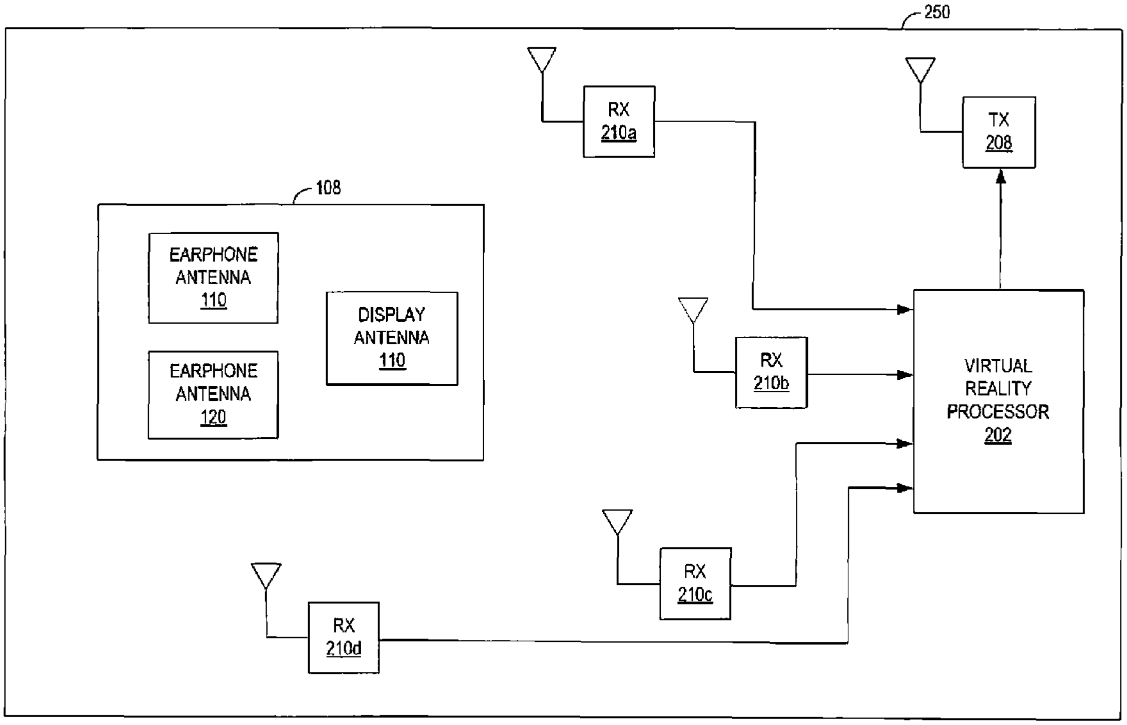
FIG. 5 shows a reverse GPS system for determining the participant's head position according to one exemplary embodiment of the present invention.

FIG. 5 illustrates a reverse GPS system in which a participant's headset 100 transmits three assigned CDMA codes, one from each antenna 110 in the antenna system 108. Preferably the antenna system 108 comprises three antennas 110 more or less equally spaced around the headset 100, e.g., one at the display 102 and one at each earphone 104, and therefore defines a reference plane. For this embodiment, the receiver system 210 comprises multiple code receivers 210*a*-210*d* placed around the viewing room 250, which pick up the coded signals transmitted from a participant's headset 100. Based on the code delay and RF phase of the received signals, the position processor 214 may determine the coarse and fine position of the head 12, and in some embodiments, the coarse and fine position of the ears and/or eyes.

The code length may be selected to provide the desired resolution. For example, the code chips should be short enough to distinguish between participants perhaps as close as 2 feet. Assuming the transceiver 208 may determine code delays with an accuracy of up to $1/8^{th}$ of a chip, that suggests a chip wavelength of 16 feet, or 5 meters. The chip rate should be around 60 Megachips per second and the bandwidth should be on the order of 60 MHz. This may be available in the unlicensed ISM band around 5 GHz, the 6 cm RF wavelength of which easily allows movements of less than a centimeter to be detected by RF phase measurements. Thus, an exemplary 60 Megachip/second CDMA transmission at 5 GHz is proposed as a way to provide substantially instantaneous and fine position data for each of the three antennas 110 on headset 100, which therefore allows all location and orientation data to be determined. If one code delay and an average RF phase is computed every 0.5 ms, then the code length may be of the order of 32,768 chips. Using three codes each, 1,000 simultaneous participants may therefore be accommodated while preserving around 10 dB of a signal to multiple participant interference ratio for each code, without the need for orthogonality. The use of orthogonal codes such as a 32,768-member modified Walsh-Hadamard set may, however, reduce computations in the position processor 206 by employing a Fast Walsh Transform to correlate with all codes. The construction of hard-wired FWTs is described in U.S. Pat. No. 5,357,454 to current Applicant.

After translating code delay and RF phase measurements to location and orientation, these physical parameters may then be further filtered by a Kalman filter, the parameters of which may be tuned to imply sanity checks, such as maximum credible participant velocity and acceleration. The internal RF environment in the viewing room 250 may be rendered more benign by, for example, papering the walls with RF absorbent material, which would also help to reduce the possibility of importing or exporting external interference.

The CDMA transmitters appropriate for a headset 100 that implements the reverse-GPS solution may be extremely small, of low power and of low cost, probably being comprised of a single chip, e.g., Bluetooth. The RF phase and delay data received by the virtual reality system 200 for each participant on these "uplinks" may also be useful in achieving the extremely high capacity required on the downlink to transmit stereo video frames to each participant.

A forward-GPS system may alternatively be employed in which different coded signal transmissions from the virtual reality transmitter 208 are received by the three headset antennas 110. The received signals are decoded and compared to determine head position within the viewing room 250. The resulting position information would then be transmitted from the headset 100 to the virtual reality system 200. The disadvantage of the forward-GPS solution is that each headset 100 becomes somewhat more complicated, comprising a GPS-like receiver with similar processing compatibility, a stereo video and sound receiver, and a transmitter.

As discussed herein, memory 204 stores a significant amount of imaging and audio data to support virtual reality simulations. To reduce the size requirements for memory 204, various data compression techniques may be employed. For example, a hierarchy of coordinates may be used to describe the vertices of a surface element relative to a reference point for that surface element, such as its center, or a vertex that is common with another surface element. Short relative distances such as the above may be described using fewer bits. The use of common vertices as the reference for several adjoining surface elements also reduces the number of bits to be stored. The common reference vertex positions are described relative to a center of the object 14 of which they are part, which also needs fewer bits than an absolute coordinate.

In estimating the storage requirements for virtual reality imaging, the following may be realized. In conventional imaging recordings, the number of bits needed to represent an object 14 is proportional to the number of pixels it spans, multiplied by the number of video frames in which it appears. Thus, if an object 14 appears for 1 minute's worth of 20 ms frames, the number of pixels needed to represent it on a DVD is multiplied by 3000. This multiplication is avoided in virtual reality, as the database of surface elements represents the entire 3D surface of the object 14, and needs to be stored in memory 204 only once, regardless of how many video frames in which it appears or from what angles it is viewed. Thus, memory 204 may store details on many more objects 14, in fact thousands more, resulting in a lower storage requirement than might at first have been believed. The total storage requirement for memory 204 is thus proportional to the total surface area of all objects 14 that will appear in a given virtual reality scene 10, but is independent of how many frames the objects 14 will appear in or from how many different angles they will be viewed. By contrast, the amount of storage required for conventional video is proportional to the number of pixels in each frame times the number of 20 ms frames that occur. In a 120 minute video for example, there would be 360,000 frames of pixels. Thus, for the same storage, 360,000 times more objects 14 may be stored in the virtual reality memory 204 than appear in a single frame.

The center coordinates of an object 14 are initially zero, and thus do not need to be stored in the memory 204. When however the object 14 is placed in a scene 10, its center coordinates are created with an initial absolute value, which may be a 32-bit floating point quantity or longer. The object 14 is also given an orientation described for example by Yaw, Pitch and Roll angles. Fast 3D graphics accelerators already exist to modify coordinates through rotations and translations in real time. Absolute location and orientation changes in moving scenes 10. Movement in such moving scenes 10 is controlled by the virtual reality processor 202, which reads the dynamic information about instantaneous object locations and orientations from the media according to a real-time clock tick. Flexible or fluid objects may also have the relative coordinates of their individual surface elements dynamically changed.

Figure 2:
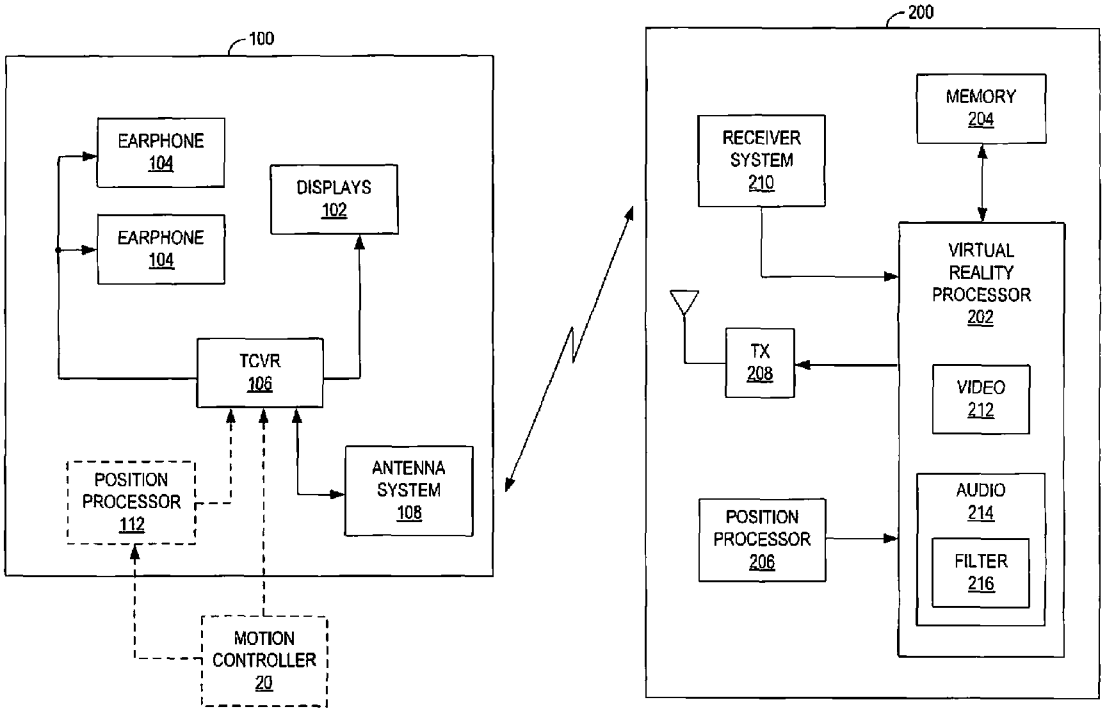
FIG. 2 shows an exemplary virtual reality headset and system.

Although FIG. 2 shows a single transmitter 208 for transmitting audio and video information to the headset 100, this would likely be inadequate for serving more than a handful of participants. Given the three antennas 110 on the headset 100 and using multiple transmitters 208 from the virtual reality system 200, capacity may be enhanced in a number of ways, e.g., by:

- considering the system to be a distributed wireless architecture, as described for example in U.S. Pat. No. 7,155, 229 to current applicant;
- using coherent macro-diversity, as described for example in U.S. Pat. Nos. 6,996,375 and 6,996,380 to current applicant,
- using MIMO techniques; or
- a combination of all of the above.

In order to design such a system, the total bit rate from virtual reality system 200 to the participants is now estimated. For virtual reality, it is desirable to use a shorter frame period than for conventional non-virtual reality television, as delay in updating an image change due to participant movement may hinder the illusion of reality. For example, a 5 ms frame refresh rate would be desirable, although this may be provided by a 20 ms refresh of all pixels with depth-2 horizontal and vertical interlacing such that ¼ of the pixels are updated every 5 ms.

For 180° plus surround vision, each display 102 should have a 2048×1024 resolution. Thus, the per-participant video rate is 2048×1024÷20 ms, or 100 million pixels per second per display 102. Achieving this for each of large number of participants, e.g., in a theater, for example, may require a transmitter per seat, fed with optical fiber from the virtual reality system 200. Of course all known video compression techniques such as MPEG standards may be employed, so long as they do not ruin the virtual reality illusion by producing artifacts.

It is not a purpose of this disclosure to elaborate on alternative methods of communicating customized displays 102 to each participant, as this is not pertinent to the invention. However, the operation of virtual reality and in particular the determination of the participant's head position is common to both imaging and audio elements.

One of the possibilities offered by virtual reality system 200 is that each participant may determine the vantage point from which he visibly and audibly partakes in the scenario. Ultimately, new artistic forms would likely emerge to exploit these new possibilities, permitting viewer participation, for example.

Each participant may wander around the set invisible to the other participants, but to prevent multiple participants blindly stumbling over each other, their movements over more than a foot or so of distance may be virtual movements controlled by an electronic motion controller 20, e.g., a joystick. Joystick 20 may be used to transmit virtual displacements, coded into the CDMA uplink, to the virtual reality system 200, so that the virtual distance over which any participant roams is substantially unlimited by the finite size of the viewing room 250. The participant may consider himself to be in a wheelchair, controlled by the joystick, but unlimited by physical constraints. For example, the wheelchair may fly at Mach 2 and pass through walls unscathed.

It is considered that the headset technology resembles cellphone technology and is within the state-of-the-art of current technology. Likewise the CDMA receivers 210 connected to the virtual reality system 200 use similar technologies to current cellular network stations. As of now, no virtual reality media or standards for virtual reality media are developed, and the processing power required in the virtual reality system 200 is state of the art or beyond. Various initiatives on the verge of virtual reality requirements are underway that will facilitate implementation. For example, hard-logic implementation of fast rendering algorithms may be used for future virtual reality systems 200.

Processor power has a tendency to continue to increase with time and at some point this will not be an issue. It is believed that the advance that virtual reality offers over traditional video or cinema, combined with the difficulty of remote delivery due to millisecond delay requirements would make virtual reality an attractive future evolution of the cinema industry to preserve attendance and deliver new experiences.

Many details of virtual reality remain to be determined and many alternative solutions may be devised, however, all are considered to be within the scope and spirit of the invention to the extent that they are covered by the attached claims. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating virtual reality audio for a participant of a virtual reality simulation, the method comprising:

computing an independent audio profile representing participant-independent propagation of sound from a virtual source to each of one or more virtual objects in the virtual reality simulation;

determining a location and an orientation of a head of the participant, comprising:

receiving a CDMA signal transmitted from each of three antennas disposed on a headset worn by the participant, wherein each transmitted signal is assigned a different CDMA code, measuring a code delay and an RF phase based on the received signals, and determining the location and orientation of the head based on the measured code delay and RF phase;

computing a dependent audio profile representing participant-dependent propagation of the sound from the one or more virtual objects to the head of the participant based on the determined location and orientation of the head;

combining said dependent audio profile with said independent audio profile to determine a total audio profile for said virtual source; and filtering said virtual source based on said total audio profile to generate said virtual reality audio associated with said virtual source at the head of the participant.

2. The method of claim 1 wherein determining the location and orientation of the head of the participant comprises:

receiving a different CDMA signal at each of three antennas disposed on a headset worn by the participant, wherein each signal is assigned a different CDMA code;

measuring a code delay and an RF phase based on the received signals; and determining the location and orientation of the head based on the measured code delay and RF phase.

3. The method of claim 1 wherein the independent audio profile accounts for the reflection and absorption of the sound as the sound from the virtual source propagates to the one or more virtual objects in the virtual simulation, and wherein the dependent audio profile accounts for the reflection and absorption of the sound as the sound propagates from the one or more virtual objects to the head of the participant.

4. The method of claim 1 further comprising transmitting said generated virtual reality audio to a headset worn by the participant.

5. The method of claim 1:

wherein computing the dependent audio profile comprises computing a dependent audio profile for each of two or more participants, where the dependent audio profile represents the participant-dependent propagation of sound from the one or more virtual objects to a determined location and orientation of the head of the two or more participants;

wherein the combining step comprises combining each dependent audio profile with said independent audio profile to determine a participant-specific total audio profile for said virtual source; and wherein the filtering step comprises filtering said virtual source based on each participant-specific total audio profile to generate said virtual reality sound for each participant.

6. The method of claim 1 wherein the location and orientation of the head is determined in a position processor disposed within a headset worn by the participant.

7. The method of claim 1 wherein the location and orientation of the head is determined in a position processor located remotely from the participant.

8. The method of claim 1 wherein the dependent audio profile is dynamically computed in an audio processor located remotely from the participant.

9. The method of claim 1 further comprising determining a location and orientation of an ear of the participant based on the determined location and orientation of the head, wherein computing the dependent audio profile comprises computing the dependent audio profile representing participant-dependent propagation of the sound from the one or more virtual objects to the at least one ear of the participant based on the determined location and orientation of the ear.

10. The method of claim 9 further comprising:

determining a location and an orientation of a second ear of the participant;

computing a second dependent audio profile representing the participant-dependent propagation of sound from the one or more virtual objects to the determined location and orientation of the second ear;

combining said second dependent audio profile with said independent audio profile to determine a second total audio profile for said virtual source; and filtering said virtual source based on said second total audio profile to generate said virtual reality sound associated with said virtual source for said second ear.

11. The method of claim 10 further comprising transmitting said generated virtual reality sound to a headset worn by the participant.

12. A virtual reality system for generating virtual reality audio for a participant of a virtual reality simulation, the virtual reality system comprising:

a position processor configured to determine a location and orientation of a head of the participant;

a receiver system comprising a plurality of receivers, wherein each receiver is configured to receive a different CDMA signal transmitted from one of three antennas disposed on a headset worn by the participant, wherein each transmitted signal is assigned a different CDMA code, and wherein the position processor determines the location and orientation of the head of the participant by:

measuring a code delay and an RF phase based on the received signals, and determining the location and orientation of the head based on the measured code delay and RF phase;

an audio processor configured to:

compute an independent audio profile representing participant-independent propagation of sound from a virtual source to each of one or more virtual objects in the virtual reality simulation;

compute a dependent audio profile representing participant-dependent propagation of the sound from the one or more virtual objects to the head of the participant based on the determined location and orientation of the head;

combine said dependent audio profile with said independent audio profile to determine a total audio profile for said virtual source; and filter said virtual source based on said total audio profile to generate said virtual reality audio associated with said virtual source at the head of the participant.

13. The virtual reality system of claim 12 wherein the independent audio profile accounts for the reflection and absorption of the sound as the sound from the virtual source propagates to the one or more virtual objects in the virtual simulation, and wherein the dependent audio profile accounts for the reflection and absorption of the sound as the sound propagates from the one or more virtual objects to the head of the participant.

14. The virtual reality system of claim 12 further comprising a transmitter to transmit said generated virtual reality audio to a headset worn by the participant.

15. The virtual reality system of claim 12 wherein the audio processor:

computes the dependent audio profile by computing a dependent audio profile for each of two or more participants, where the dependent audio profile represents the participant-dependent propagation of sound from the one or more virtual objects to a determined location and orientation of the head of the two or more participants;

combines the dependent and independent audio profiles by combining each dependent audio profile with said independent audio profile to determine a participant-specific total audio profile for said virtual source; and filters said virtual source by filtering said virtual source based on each participant-specific total audio profile to generate said virtual reality sound for each participant.

16. The virtual reality system of claim 12 wherein the position processor is further configured to determine a location and orientation of an ear of the participant based on the determined location and orientation of the head, and wherein the audio processor computes the dependent audio profile by computing the dependent audio profile representing participant-dependent propagation of the sound from the one or more virtual objects to the at least one ear of the participant based on the determined location and orientation of the ear.

17. The virtual reality system of claim 16 wherein the position processor is further configured to determine a location and an orientation of a second ear of the participant, and wherein the audio processor is further configured to:

compute a second dependent audio profile representing the participant-dependent propagation of sound from the one or more virtual objects to the determined location and orientation of the second ear;

combine said second dependent audio profile with said independent audio profile to determine a second total audio profile for said virtual source; and filter said virtual source based on said second total audio profile to generate said virtual reality sound associated with said virtual source for said second ear.

18. The virtual reality system of claim 17 further comprising a transmitter to transmit said generated virtual reality sound to a headset worn by the participant.

* * * * *

UNITED STATES PATENT AND TRADEMARK OFFICE

CERTIFICATE OF CORRECTION

PATENT NO. : 8,243,970 B2
APPLICATION NO. : 12/189525
DATED : August 14, 2012
INVENTOR(S) : Dent It is certified that error appears in the above-identified patent and that said Letters Patent is hereby corrected as shown below:

Title Page, Item (56), under "OTHER PUBLICATIONS", in Column 2, Line 1, delete "Disance" and insert -- Distance --, therefor.

Signed and Sealed this
Fifth Day of February, 2013

Teresa Stanek Rea
*Acting Director of the United States Patent and Trademark Office*